(12) United States Patent
Oh

(10) Patent No.: US 10,166,903 B2
(45) Date of Patent: Jan. 1, 2019

(54) VEHICULAR SEAT BACK TABLE

(71) Applicant: Hyung Jong Oh, Gwangju (KR)

(72) Inventor: Hyung Jong Oh, Gwangju (KR)

( * ) Notice: Subject to any disclaimer, the term of this patent is extended or adjusted under 35 U.S.C. 154(b) by 0 days.

(21) Appl. No.: 15/844,787

(22) Filed: Dec. 18, 2017

(65) Prior Publication Data

US 2018/0178699 A1 Jun. 28, 2018

(30) Foreign Application Priority Data

Dec. 16, 2016 (KR) .................. 10-2016-0172368

(51) Int. Cl.
| | |
|---|---|
| *B60N 3/00* | (2006.01) |
| *F16H 19/04* | (2006.01) |
| *F16H 1/28* | (2006.01) |
| *B60N 2/64* | (2006.01) |

(52) U.S. Cl.
CPC .............. *B60N 3/001* (2013.01); *F16H 1/28* (2013.01); *F16H 19/04* (2013.01); *B60N 2/64* (2013.01); *B60Y 2400/405* (2013.01)

(58) Field of Classification Search
CPC ....... B60N 3/004; B64D 11/0638; A47C 7/68; A47C 7/70; A47D 1/0083
USPC ...... 297/146, 154, 150; 108/44, 45, 152, 47, 108/42
See application file for complete search history.

(56) References Cited

U.S. PATENT DOCUMENTS

| | | | | |
|---|---|---|---|---|
| 1,333,301 A | * | 3/1920 | Fohman ................. | A47B 39/02 297/164 |
| 1,790,468 A | * | 1/1931 | Frank et al. ............ | A47C 7/70 108/117 |
| 1,809,866 A | * | 6/1931 | Riesche .................. | A47B 5/04 108/116 |
| 1,887,102 A | * | 11/1932 | Mathie ................... | A47B 63/02 108/47 |
| 2,132,279 A | * | 10/1938 | Wicknick ............... | B60N 3/004 297/146 |
| 2,168,210 A | * | 8/1939 | Hawksley .............. | B60N 3/004 108/38 |
| 2,249,287 A | * | 7/1941 | Gearhart ................ | B60N 3/004 108/38 |
| 2,619,395 A | * | 11/1952 | Kent ...................... | B60N 3/004 108/38 |
| 2,963,078 A | * | 12/1960 | Ferrelle .................. | B60N 3/004 108/38 |

(Continued)

FOREIGN PATENT DOCUMENTS

| | | |
|---|---|---|
| KR | 100966376 B1 | 6/2010 |
| KR | 20110004602 A | 1/2011 |
| KR | 101454923 B1 | 10/2014 |

*Primary Examiner* — Jose V Chen
(74) *Attorney, Agent, or Firm* — Brooks Kushman P.C.

(57) ABSTRACT

Disclosed herein is a vehicular seat back table apparatus including: a guide member installed at each of both sides of a table installation space of a backrest and including a rack gear portion; a driving shaft at which a pinion rotatably, which is installed at a guide frame and engaged with the rack gear portion of the guide member, is installed; a driving unit rotated by a rotation varying unit connected to the driving shaft, installed at a side surface of a table, and including a rotating hinge shaft member configured to provide a rotational force to rotate the table when the pinion is moved along the rack gear portion; and an elastic bias portion configured to support the guide frame to move upwardly along the guide member.

2 Claims, 8 Drawing Sheets

(56) References Cited

U.S. PATENT DOCUMENTS

| | | | | | |
|---|---|---|---|---|---|
| 3,795,422 | A | * | 3/1974 | Robinson | A47C 7/70 244/122 R |
| 4,973,017 | A | * | 11/1990 | Takagi | B60N 3/004 248/292.13 |
| 5,931,527 | A | * | 8/1999 | D'Onofrio | B60R 5/045 297/146 |
| 7,963,231 | B2 | * | 6/2011 | Osborne | A47B 5/006 108/40 |
| 8,695,513 | B2 | * | 4/2014 | Figueras Mitjans | A47B 5/006 108/115 |
| 9,731,829 | B2 | * | 8/2017 | Gow | B64D 11/0638 |
| 9,955,779 | B2 | * | 5/2018 | Hoeftberger | A47B 5/04 |
| 2007/0227407 | A1 | * | 10/2007 | Cartensen | A47B 5/006 108/33 |
| 2016/0250958 | A1 | * | 9/2016 | Saada | B60N 3/004 297/163 |

* cited by examiner

VEHICULAR SEAT BACK TABLE

CROSS-REFERENCE TO RELATED APPLICATIONS

This application claims foreign priority benefits under 35 U.S.C. § 119(a)-(d) to KR 10-2016-0172368 filed Dec. 16, 2016, which is hereby incorporated by reference in its entirety.

FIELD OF THE INVENTION

The present invention relates to a seat back table, and more particularly, to a seat back table which is installed at a seat backrest of a vehicle, an aircraft, or the like and automatically unfolded.

DISCUSSION OF RELATED ART

Generally, seats installed in an interior of a vehicle are typically classified into a bucket seat for a passenger and a bench seat on which two or more passengers can simultaneously seat. A head restraint is installed at an upper end portion of a backrest or a seat back table which can be folded or unfolded backward is installed at a backrest for the sake of a passenger's convenience.

Such a seat back table is installed on the rear of a seat backrest so that a backseat passenger can use the seat back table for reading, handwriting, or a simple dining table, and is formed to be unfolded when it is used and folded when it is not used.

A multi link typed seat back table was disclosed in Korean Patent Registration No. 0966376, and a vehicular seat on which an auxiliary table is installed was disclosed in Korean Laid-open Patent Application No. 1997-0010328. The disclosed vehicular seat has a structure in which a table is unfolded from or folded on a rear surface of a backrest in a sliding manner.

A vehicular table was disclosed in Korean Laid-open Patent Application No. 2011-004602, and vehicular seat back table apparatus was disclosed in Korean Patent Registration No. 1454923. The disclosed seat back table apparatus includes a table member on which things may be placed, a first link configured to connect a middle portion of a side surface of the table member and a seat back, a second link configured to connect one end portion of the side surface of the table member and the seat back and support a lower portion of the first link when the table member is unfolded from the seat back, and sliding parts provided at both side surfaces of the table member and configured to allow the table member to slide forward and backward from the seat back.

However, since such a conventional seat back has a structure in which the table member is rotated by the links, there is a problem in that the table member is rotated while the table member is spaced apart from a rear surface of the seat back.

SUMMARY OF THE INVENTION

The present invention is directed to a vehicular seat back table apparatus which is installed at a backrest of a vehicular seat and in which generation of noise is reduced because the vehicular seat back table apparatus is unfolded while rotating at a uniform speed and operability thereof is improved.

The present invention is also directed to a vehicular seat back table apparatus having a relatively simple structure and capable of improving continuity of operation using a rotation varying unit.

According to an aspect of the present invention, there is provided a vehicular seat back table apparatus including a guide member installed at each of both sides of a table installation space of a backrest and including a rack gear portion, a driving shaft at which a pinion, which is rotatably installed at a guide frame and engaged with the rack gear portion of the guide member, is installed, a driving unit rotated by a rotation varying unit connected to the driving shaft, installed at a side surface of a table, and including a rotating hinge shaft member configured to provide a rotational force to rotate the table when the pinion is moved along the rack gear portion, and an elastic bias portion configured to support the guide frame to move upwardly along the guide member.

The vehicular seat back table apparatus may further include a damping unit 15 installed at the guide frame and the guide member and configured to provide a damping force when the guide frame, which moves along the guide member, is lifted or lowered.

In addition, the vehicular seat back table apparatus may further include a guide roller unit installed on the guide frame and configured to guide the guide frame to move along the guide member.

The rotation varying unit may include a sun gear installed at an end portion of the driving shaft, planetary gears installed on an outer circumferential surface of the sun gear and rotatably coupled to a driving frame by a hinge shaft, and a ring gear portion provided at the rotating hinge shaft member and engaged with each of the planetary gears. The guide members installed at both sides of the table installation space of the backrest are fixed to both end portions of a distance maintaining plate configured to maintain a parallel state.

According to an aspect of the present invention, there is provided a vehicular seat back table apparatus including a guide member installed at each of both sides of a table installation space of a backrest and including a rack gear portion, a driving unit including a pinion, which is rotatably installed in a guide frame and engaged with the rack gear portion of the guide member, and a rotating hinge shaft member configured to rotate together with the pinion when a table is rotated, and an elastic bias portion configured to support the guide frame to move upwardly along the guide member.

The vehicular seat back table apparatus may further include a damping unit installed at the guide frame and the guide member and configured to provide a damping force when the guide frame, which moves along the guide member, is lifted or lowered.

The vehicular seat back table apparatus may further include a guide roller unit installed on the guide frame and configured to guide the guide frame to move along the guide member. A gear ratio of the pinion to the rack gear portion may be provided such that the pinion configured to rotate together with the rotating hinge shaft member may be moved to a position at which a length of the unfolded table is secured.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
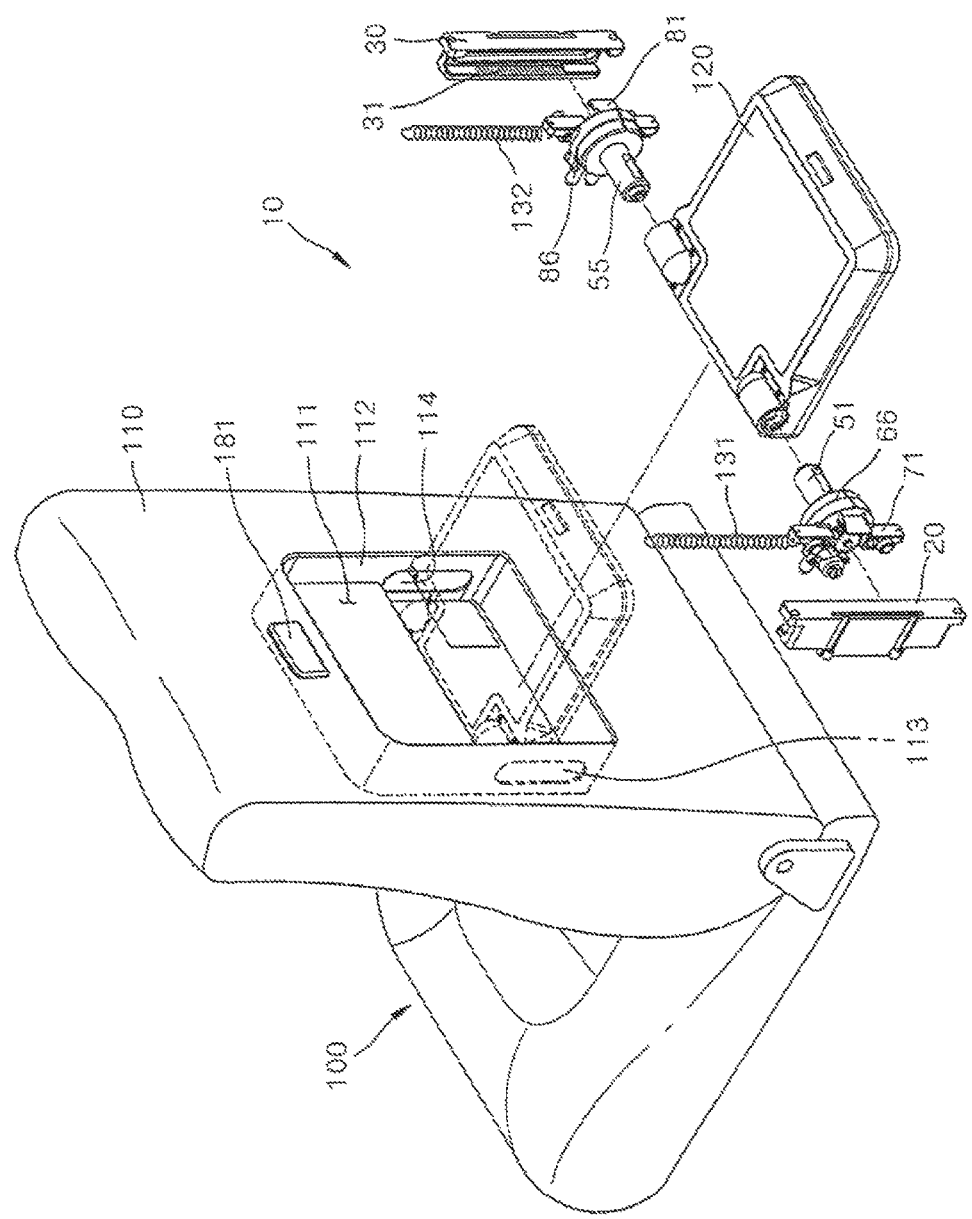
FIG. 1 is an exploded perspective view illustrating a vehicular seat back table assembly according to an embodiment of the present invention.
Figure 2:
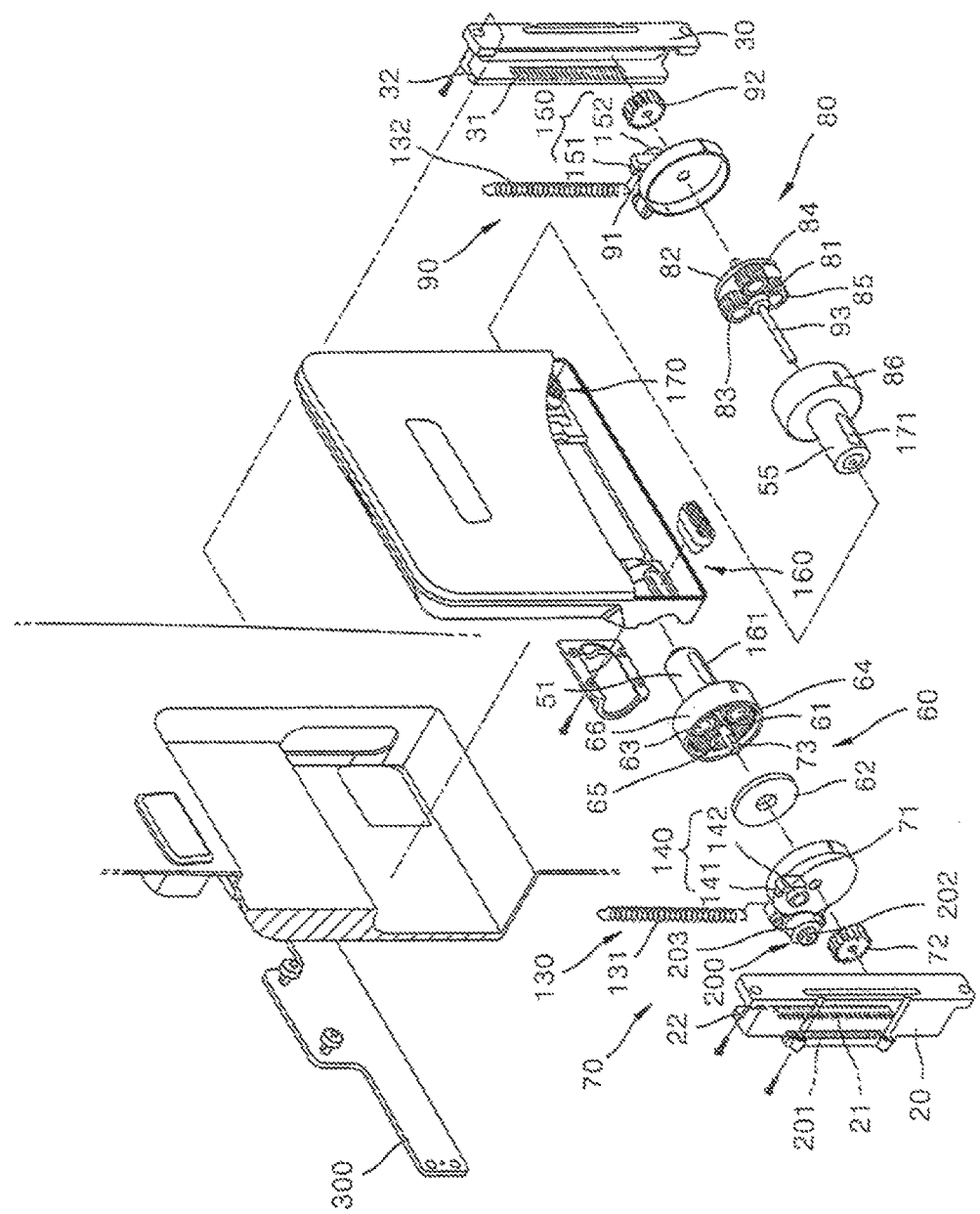
FIG. 2 is an exploded perspective view illustrating the vehicular seat back table assembly according to the embodiment of the present invention.

Vehicular seat back table assemblies according to embodiments of the present invention are shown in FIGS. 1 to 4.

Referring to the drawings, a vehicular seat back table assembly 10 according to an embodiment of the present invention is installed at a rear surface of a backrest 110 of a seat 100 to be used as a table by a passenger seated on a backseat, a table installation space 111 is formed to be recessed from the rear surface of the backrest 110, and a first guide member 20 having a first rack gear portion 21 and a second guide member 30 having a second rack gear portion 31 are installed at corresponding both sides of the table installation space 111. In addition, a first rotating hinge shaft member 51 is installed at the first guide member 20 at one side of the table 120 and a second rotating hinge shaft member 55 is installed at the second guide member 30 at the other side of the table 120. In addition, first and second rotation varying units 60 and 80 respectively configured to move the first and second guide members 20 and 30 are respectively installed at the first and second rotating hinge shaft members 51 and 55.

A first rotation driving unit 70 is formed with the first rotating hinge shaft member 51 and the first rotation varying unit 60, and a second rotation driving unit 90 is formed with the second rotating hinge shaft member 55 and the second rotation varying unit 80. The first rotation driving unit 70 and the second rotation driving unit 90 include elastic bias portions 130 upwardly elastically biased along the first and second guide members 20 and 30.

Each element of the above-described vehicular seat back table assembly according to the embodiment of the present invention will be described in detail below.

The seat 100 of the vehicular seat back table assembly 10 according to the embodiment of the present invention includes the backrest 110, and the backrest 110 is installed to be forward-or-backwardly rotatable or fixable. In addition, the table installation space 111 is formed to be recessed at the rear surface of the backrest 110 so that the table 120 protrudes or retracts. The table installation space 111 may be formed in a case member 112 separately installed on the backrest 110.

In addition, first and second slots 113 and 114 are formed in corresponding sides of the table installation space 111 so that movement of the first rotating hinge shaft member 51 and the second rotating hinge shaft member 55 that are coupled to the table 120 is not interfered with. The table installation space 111 formed in the backrest 110 may be formed to have substantially the same shape and size as the table 120.

In addition, a first guide portion 22 is formed in the first guide member 20 fixed at both side surfaces of the table installation space 111 in a direction corresponding therewith, and the first rack gear portion 21 is formed in an inner surface of the first guide portion 22. A second guide portion 32 is formed in the second guide member 30 in a direction corresponding therewith, and the second rack gear portion 31 is formed in an inner surface of the second guide portion 32.

In addition, the table 120 moves into or out of the table installation space 111 by being rotated while being lifted or lowered along the first and second guide members 20 and 30 while both sides of the table 120, at which the first rotation driving unit 70 and the second rotation driving unit 90 are positioned, are supported. The first rotation driving unit 70 includes a first driving shaft 73 at which a first pinion 72, which is rotatably installed at a first guide frame 71 and engaged with the first rack gear portion 21 formed in the first guide portion 22 of the first guide member 20, is installed and the first rotation varying unit 60 configured to rotate the first rotating hinge shaft member 51 formed at one side surface of the table 120 using a rotational force of the first driving shaft 73.

The second rotation varying unit 60 includes a sun gear 61 installed at an end portion of one side of the first driving shaft 73, first planetary gears 63 to 65 that are installed at an outer circumferential surface of the sun gear 61 to be engaged with the sun gear 61 and rotatably supported by a first gear frame 62, and a first ring gear portion 66 engaged with each of the first planetary gears 63 to 65 and provided at the first rotating hinge shaft member 51. The first planetary gears 63 to 65 are engaged with an inner surface of the first ring gear portion 66.

The first rotating hinge shaft member 51 is fixed at a lower portion of one side surface of the table 120 through the first slot 113 to be fixed to the lower portion of one side surface of the table 120.

In addition, the first guide frame 71 further includes a guide roller unit 140 configured to move along side and front surfaces of the first guide member 20. The first guide roller unit 140 includes first guide rollers 141 rotatably installed at the first guide frame 71 to be in contact with a side surface of the first guide member 20 and second guide rollers 142 that are in contact with a front surface of the first guide member 20. The first guide roller unit 140 guides the first rack gear portion 21 so that coupling with the first pinion 72 is not separated by an external force and guides the first rotation driving unit 70 to be lifted or lowered along the first guide member 20.

Meanwhile, the second rotation driving unit 90 has substantially the same structure as the first rotation driving unit 70.

The second rotation driving unit 90 rotatably supports one side of the table 120 having the other side rotatably supported by the first rotation driving unit 70.

The second rotation driving unit 90 includes a second driving shaft 93 at which a second pinion 92, which is rotatably installed in the second guide frame 91 and engaged with the second rack gear portion 31 that is formed in the second guide portion 32 of the second guide member 30, is installed and the second rotation 25 varying unit 80 configured to rotate the second rotating hinge shaft member 55 formed at one side surface of the table 120 using a rotational force of the second driving shaft 93. The second rotation varying unit 80 includes a second sun gear 81 installed at an end portion of the other side of the second driving shaft 93, second planetary gears 83 to 85 that are installed at an outer circumferential surface of the second sun gear 81 to be engaged with the second sun gear 81 and rotatably supported by a second gear frame 82, and a second ring gear portion 86 engaged with the second planetary gears 83 to 85 and installed at the second rotating hinge shaft member 55.

Figure 4:
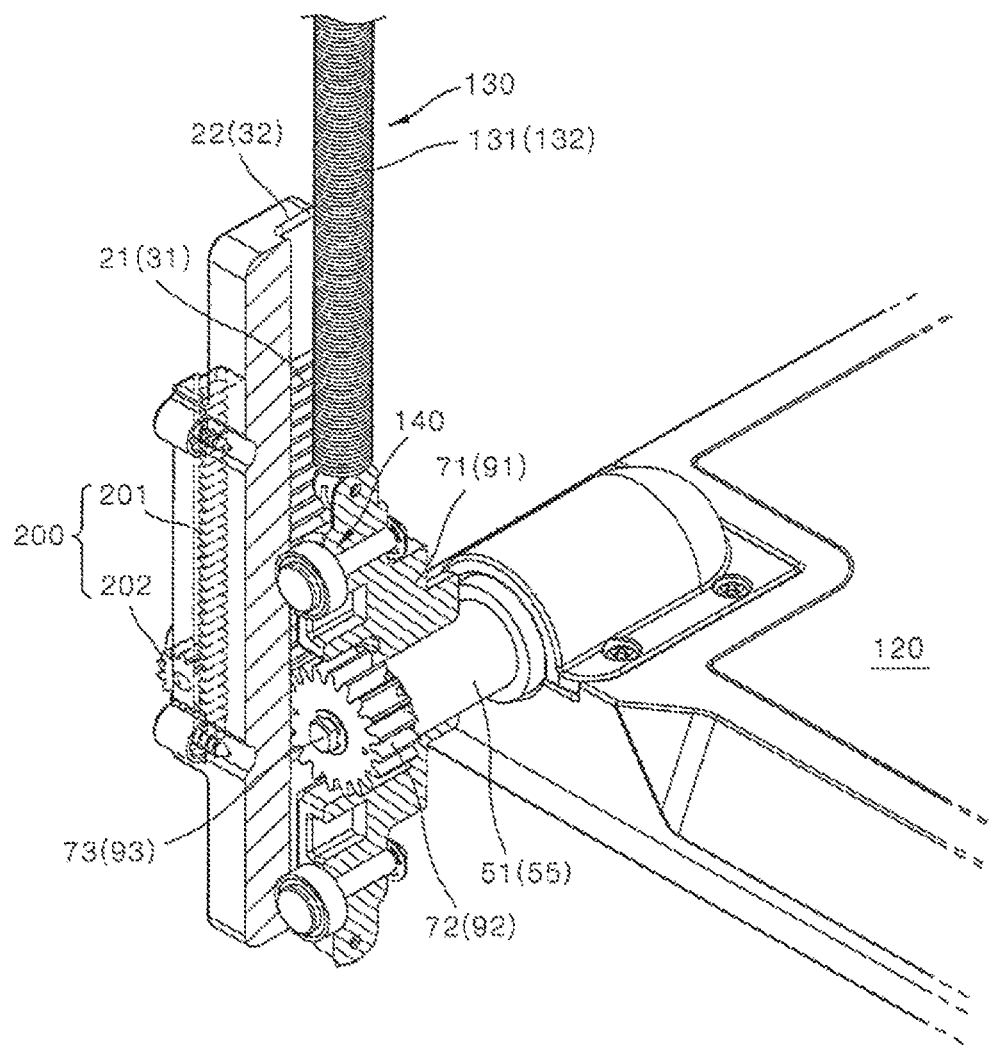
FIG. 4 is a side view illustrating an operation state of the vehicular seat back table assembly illustrated in FIG. 1.

The first rotation driving unit 70 and the second rotation driving unit 90 are not limited to the above-described embodiment. It may be preferable for the first pinion 72 and the first rotating hinge shaft member 51 to be integrally formed and for the second pinion 92 and the second rotating hinge shaft member 55 to be integrally formed so that the first and second pinions 72 and 92 respectively move along the first and second rack gear portions 21 and 31 when the table 120 rotates as shown in FIG. 4. The second rotating hinge shaft member 55 is fixed to a lower portion of the other side surface of the table 120 through the second slot 114 to be fixed to the other side of the table 120.

In addition, the second guide frame 91 further includes a second guide roller unit 150 configured to move along side and front surfaces of the second guide portion 32 of the second guide member 30, and the second guide roller unit 150 has substantially the same structure as the first guide roller unit 140.

In addition, the elastic bias portion 130 provides an elastic force to move the first and second guide frames 71 and 91 along the respective first and second guide 25 members 20 and 30, and may be formed with elastic springs 131 and 132 having both end portions hooked at upper end portions of the first and second guide frames 71 and 91 and the table installation space 111 of the backrest 110. The elastic bias portion 130 is not limited to the above-described embodiment as long as the elastic bias portion 130 has a structure that upwardly elastically biases the first and second guide frames 71 and 91.

In addition, first and second table rotation portions 160 and 170 configured to rotate downward when a dangerous situation occurs in a state in which the table 120 is maintained in a horizontal state are included at a coupling portion at which the first and second rotating hinge shaft members 51 and 55 and the table 120 are coupled. The first table rotation portion 160 has a structure in which a first rotation coupling hole 161 is formed in the first rotating hinge shaft member 51, a ball flange member 162 is installed at a side of the table corresponding to the first rotation coupling hole 161, and the first rotation coupling hole 161 and the ball flange member 162 are coupled to each other. When the ball flange member 162 is coupled to the first rotation coupling hole 161, the table 120 is maintained in the horizontal state when the table 120 is rotated and unfolded from the backrest 110 and the table 120 is maintained in a vertical state when the table is folded toward the backrest 110. In addition, when the table is rotated downward by an external force, the table 120 is rotated because the ball flange member 162 is separated from the rotation coupling hole 161 of the first rotating hinge shaft member 51.

In addition, a locking portion 181 installed at an upper portion of the backrest 110, that is, an upper portion of the table installation space 111, includes a button 180 provided to fix and support an upper end portion of the table 120 to maintain a state in which the table 120 is folded, that is, a state in which the table 120 is inserted into the table installation space 111, or to release a locking state to unfold the table. Although the locking portion is not illustrated in the drawings, a locking groove is formed at the upper end portion of the table 120, and a hook configured to be coupled to or separated from the locking groove is provided. However, the locking portion is not limited thereto.

In addition, damping units 200 are installed between the first guide frame 71 and the first guide member 20 and between the second guide frame 91 and the second guide member 30, and each of the damping units may be formed with a sub-rack member 201, a damper 203, and a sub-pinion 202 installed at each of the first and second guide members 20 and 30. It is preferable for a hydraulic damper to be used as the damper of the damping unit 200.

In addition, a support plate 300 having both end portions connected to the first guide frame 71 and second guide frame 72 may be installed to maintain a distance between the first guide frame 71 and second guide frame 72.

Operation of the above-described vehicular seat back table assembly according to the embodiment of the present invention will be described below.

Figure 3:
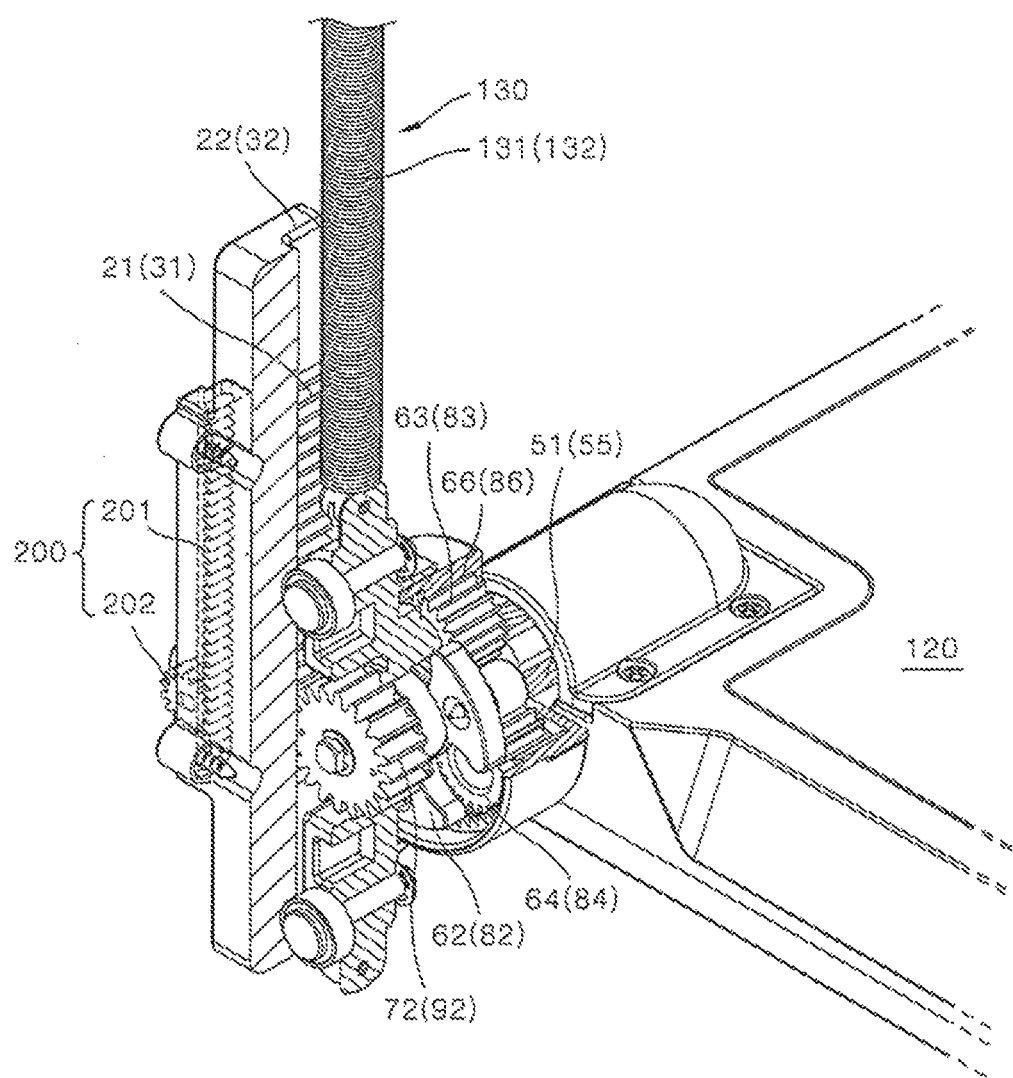
FIG. 3 is an exploded perspective view illustrating a vehicular seat back table assembly according to another embodiment of the present invention.
Figure 5:
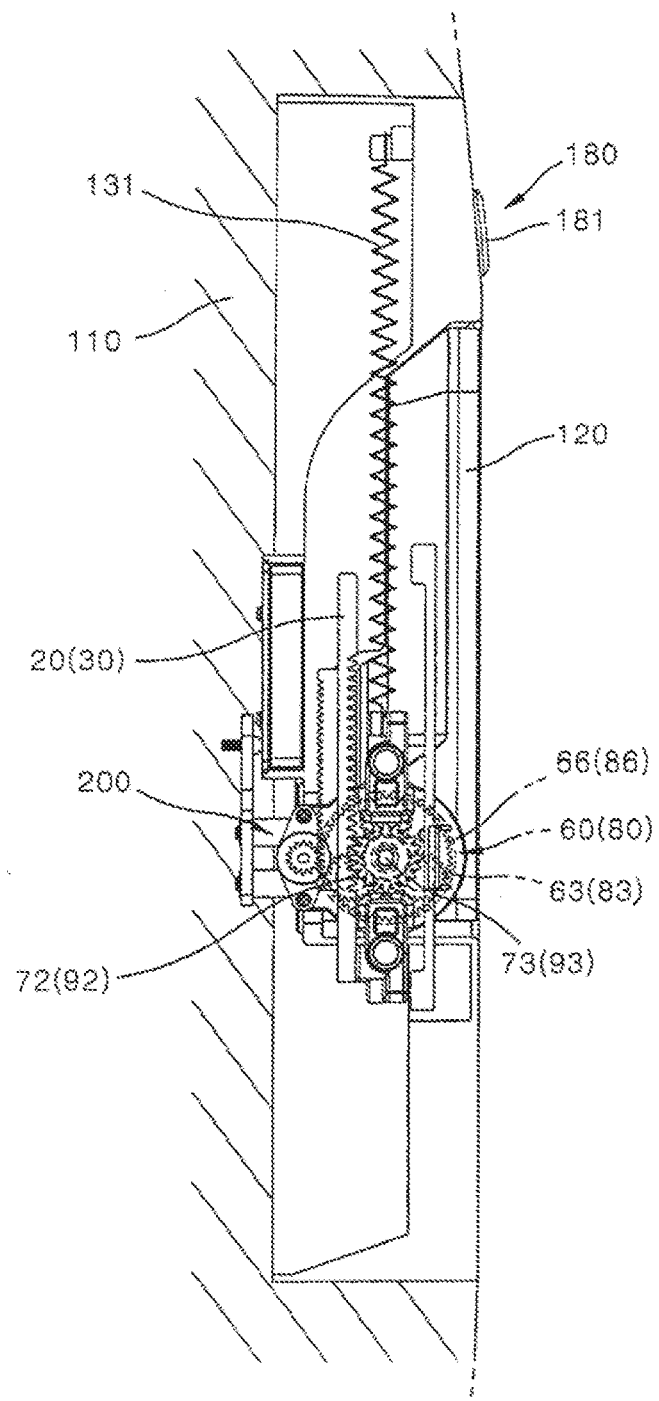
FIGS. 5 to 7 are side views illustrating sequential operation states of the vehicular seat back table assembly.
Figure 6:
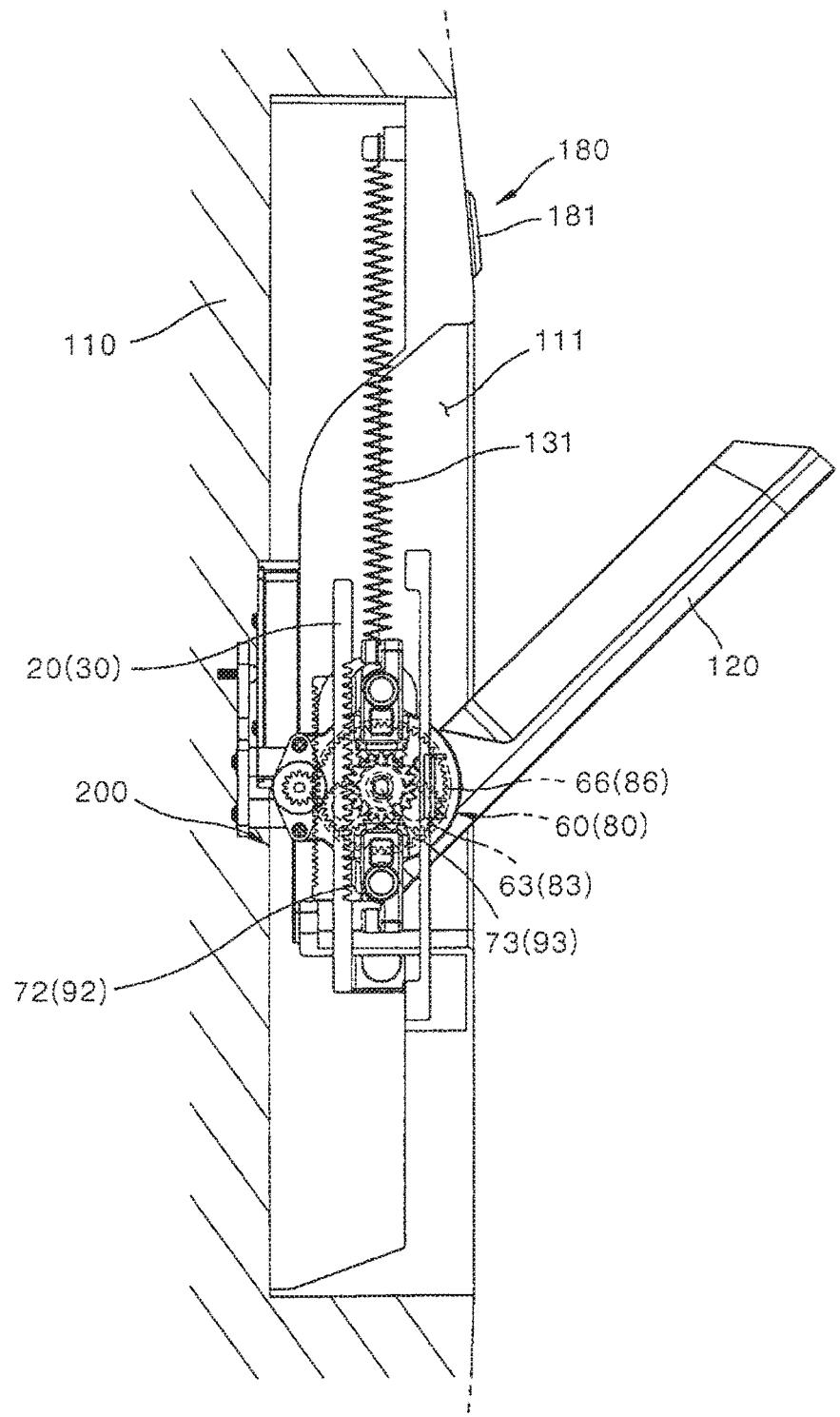
Figure 7:
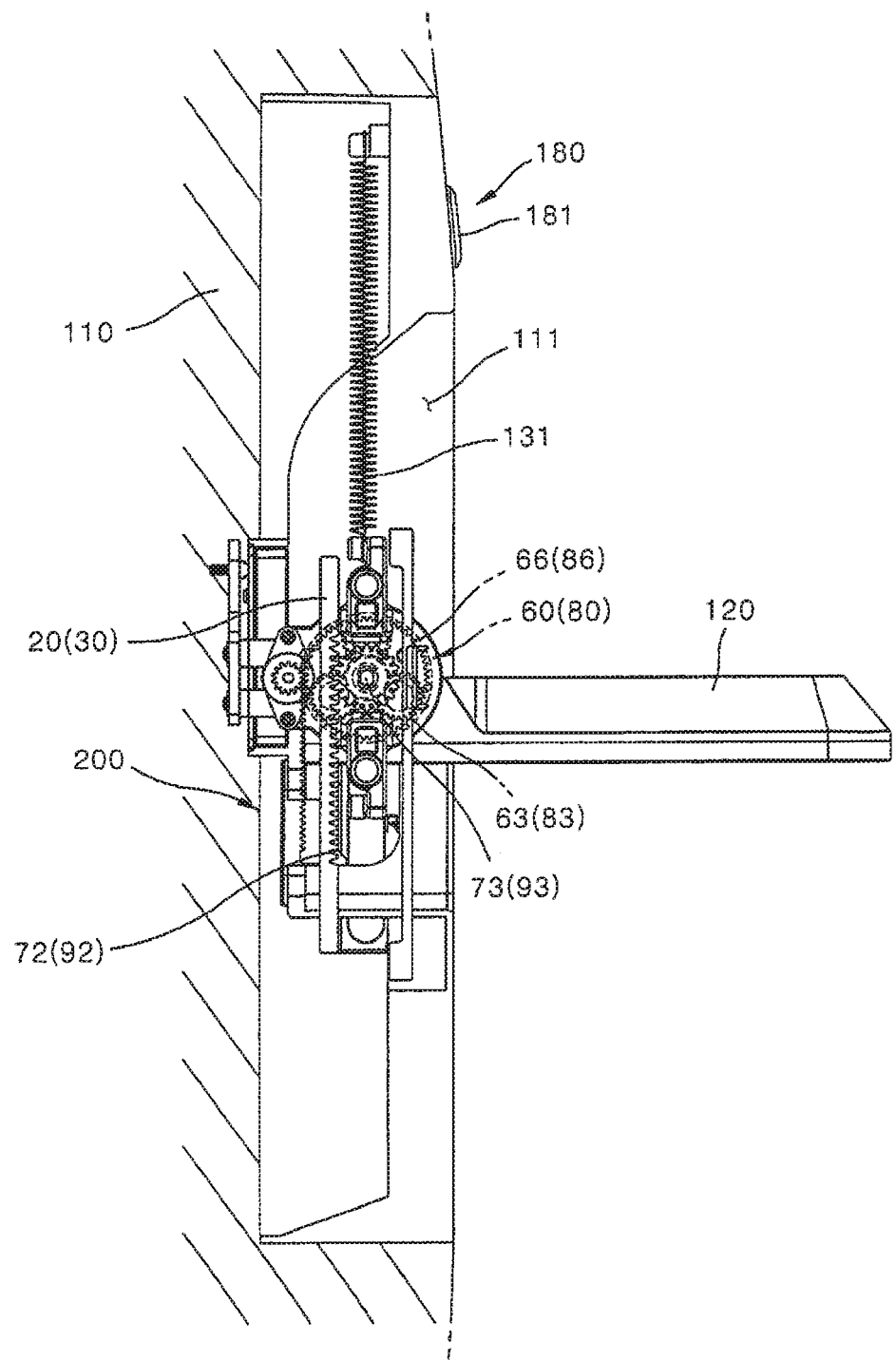
Figure 8:
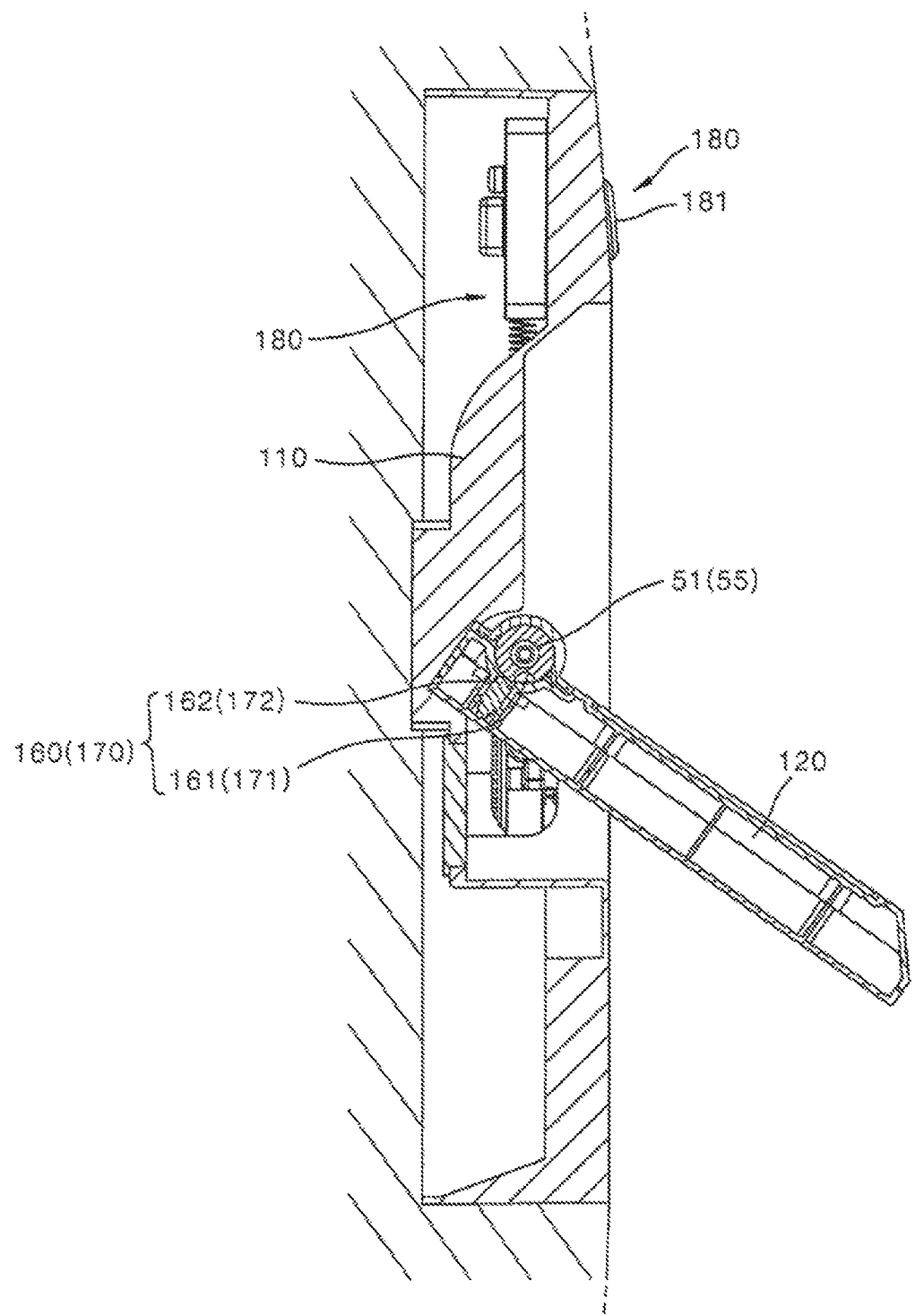
FIG. 8 is a side view illustrating a state in which a table of the vehicular seat back table assembly rotates downward when an impact is applied to the table.

First, in the state in which the table 120 is inserted into the table installation space 111, the button 171 of the locking portion 170 is pushed to release the locking state as illustrated in FIGS. 3 and 5. Then, the first and second guide frames 71 and 91 are upwardly biased by a spring tension of the elastic bias portion 130.

Accordingly, the table 120 is lifted while starting to rotate in an opening direction. Accordingly, when the first and second rotating hinge shaft members 51 and 55 are rotated, the first and second planetary gears 63 to 65 and 83 to 85 engaged with the first and second ring gear portions 66 and 86 are rotated, and the first and second sun gears 61 and 81 are rotated by the first and second planetary gears 63 to 65 and 83 to 85. The first and second driving shafts 73 and 93 installed in the first and second sun gears 61 and 81 are rotated, and the first and second pinions 72 and 92 installed at the first and second driving shafts 73 and 93 are respectively lifted along the first and second rack gear portions 21 and 31.

Accordingly, the table 120 opens while being lifted by the first and second rotating hinge shaft members 51 and 55. Since the first and second guide frames 71 and 91 come into contact with the upper portions of the first and second slots 113 and 114 when the table 120 is maintained in the horizontal state due to the above-described lifting, the first and second guide frames 71 and 91 are not lifted anymore. Accordingly, the table 120 may be maintained in the horizontal state. In addition, when the table 120 receives a large impact from the outside and a rotational force by which the table 120 is rotated downward, since the first and second ball flange members 162 and 172 are separated from the first and second rotation coupling holes 161 and 171 of the first and second rotating hinge shaft members 51 and 55 of the first and second table rotation portions 160 and 170, the table 120 is rotated downward.

In addition, when a user finishes using the table 120 and folds the table 120, the user lifts the table 120 in a closing direction, that is, lifts an end portion of the table 120 upward.

Then the table 120 overcomes the spring tension of the elastic bias portion 130 and starts to rotate in the closing direction. Accordingly, since the first and second rotating hinge shaft members 51 and 55 rotate in a direction opposite to the opening direction, the provided first and second planetary gears 63 to 65 and 83 to 85 engaged with the first and second ring gear portions 66 and 86 are rotated, and the first and second sun gears 61 and 81 are rotated by the first and second planetary gears 63 to 65 and 83 to 85. The first and second driving shafts 73 and 93 installed in the first and second sun gears 61 and 81 are reversely rotated, and the first and second pinions 72 and 92 installed at the first and second driving shaft 73 and 93 are respectively lowered along the first and second rack gear portions 21 and 31. Accordingly, the table 120 closes while being lowered by the first and second rotating hinge shaft members 51 and 55. Due to the above-described action, the table 120 is inserted into the table installation space 111 and is maintained in the vertical state and is supported by the locking portion 170 not to be withdrawn from the table installation space 111.

As described above, the vehicular seat back table apparatus can sequentially open and close the table and decrease an area occupied while the table is opened. In a vehicular seat back table according to the embodiment of the present invention, rotation is smoothly and easily performed during operation, an operation space for rotation of the table can be minimized because the rotating hinge shaft member has a structure configured to be rotated while being vertically lifted, and a length of the unfolded table is easily secured.

Particularly, in the vehicular seat back table, the rotating hinge shaft member has a structure configure to be lifted by a pinion that is rotated in a state in which a rack gear portion and the pinion are coupled, and thus reliability and continuity of operation can be improved.

While the invention has been described with reference to the embodiments illustrated in the accompanying drawings, the embodiments should be considered in a descriptive sense only, and it should be understood that various alterations and other equivalent embodiments may be made by those skilled in the art. Therefore, the scope of the invention is defined by the appended claims.

What is claimed is:

1. A vehicular seat back table apparatus pivotable between a stowed position in a table installation space of a backrest and a deployed position, comprising:
    a guide member installed at each of both sides of the table installation space, each guide member including a rack gear portion;
    a pinion gear, rotatably coupled to the rack gear portion of each guide member;
    a rotation varying unit associated with and coupled to each of the pinion gears, each rotation varying unit connected by a rotatable hinge shaft to one side of a table, and coupled to an associated pinon gear through a sun gear installed at an end portion of the shaft, the sun gear being coupled to planetary gears installed on an outer circumferential surface of the sun gear and the planetary gears being coupled to a ring gear, whereby pivotal motion of the table is transmitted through the gears;
    first and second springs, each spring having one end connectable to a guide member and another end connectable to the backrest for biasing each guide member toward a table-stowed position.

2. The vehicular seat back table apparatus of claim 1, further comprising a damping unit installed intermediate and rotationally coupled to each guide member and each rotation varying unit, each damping unit comprising a sub-rack gear and a sub-pinion gear and a hydraulic damper configured to provide a damping force when the table, is lifted or lowered.

* * * * *